(12) United States Patent
Sharma et al.

(10) Patent No.: US 8,565,218 B2
(45) Date of Patent: Oct. 22, 2013

(54) FLOW PATH DISCOVERY IN NETWORK TO GUARANTEE MULTIPLE METRIC QOS CONSTRAINTS

(75) Inventors: Puneet Sharma, Menlo Park, CA (US); Amit Mondal, Evanston, IL (US); Sujata Banerjee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

(21) Appl. No.: 12/263,429

(22) Filed: Oct. 31, 2008

(65) Prior Publication Data

US 2010/0278069 A1 Nov. 4, 2010

Related U.S. Application Data

(60) Provisional application No. 61/059,059, filed on Jun. 5, 2008.

(51) Int. Cl.
*H04L 12/28* (2006.01)
*G06F 15/173* (2006.01)

(52) U.S. Cl.
USPC .......................... 370/351; 370/392; 709/238

(58) Field of Classification Search
None
See application file for complete search history.

(56) References Cited

U.S. PATENT DOCUMENTS

| | | | | | |
|---|---|---|---|---|---|
| 5,467,343 | A * | 11/1995 | Lee et al. | .................. | 370/351 |
| 6,256,309 | B1 * | 7/2001 | Daley et al. | .............. | 370/395.43 |
| 6,954,435 | B2 * | 10/2005 | Billhartz et al. | .............. | 370/252 |
| 7,603,478 | B2 * | 10/2009 | Thurman et al. | .............. | 709/238 |
| 7,643,426 | B1 * | 1/2010 | Lee et al. | .................. | 370/238 |
| 8,218,445 | B2 * | 7/2012 | Katz et al. | ................... | 370/238 |
| 2002/0065932 | A1 * | 5/2002 | Kobayashi | .................. | 709/233 |
| 2002/0097701 | A1 * | 7/2002 | Lupien et al. | ................. | 370/338 |
| 2003/0002444 | A1 * | 1/2003 | Shin et al. | .................... | 370/238 |
| 2003/0005149 | A1 * | 1/2003 | Haas et al. | ................... | 709/238 |
| 2003/0161268 | A1 * | 8/2003 | Larsson et al. | ................. | 370/229 |
| 2003/0189919 | A1 * | 10/2003 | Gupta et al. | .................. | 370/351 |
| 2003/0204587 | A1 * | 10/2003 | Billhartz | ........................ | 709/224 |
| 2003/0223359 | A1 * | 12/2003 | Einstein et al. | ............... | 370/228 |
| 2004/0114569 | A1 * | 6/2004 | Naden et al. | .................. | 370/351 |
| 2004/0136324 | A1 * | 7/2004 | Steinberg et al. | ............. | 370/238 |
| 2004/0264422 | A1 * | 12/2004 | Calcev et al. | ................. | 370/338 |
| 2005/0147081 | A1 * | 7/2005 | Acharya et al. | ............... | 370/351 |
| 2005/0195739 | A1 * | 9/2005 | Grover et al. | ................. | 370/225 |
| 2006/0268879 | A1 * | 11/2006 | Xhafa et al. | .................. | 370/392 |
| 2008/0123532 | A1 * | 5/2008 | Ward et al. | ................... | 370/238 |
| 2008/0186869 | A1 * | 8/2008 | Jeon et al. | ..................... | 370/252 |
| 2010/0014859 | A1 * | 1/2010 | D'Alessandro et al. | ........ | 398/48 |
| 2010/0278069 | A1 * | 11/2010 | Sharma et al. | ................. | 370/254 |

OTHER PUBLICATIONS

Mondal et al. Supporting Application Network Flows with Multiple QoS Constraints.*
Supporting Application Network Flows with Multiple QoS—Mondal et al.—2007.*

(Continued)

*Primary Examiner* — Marsha D Banks Harold
*Assistant Examiner* — Christopher Wyllie

(57) ABSTRACT

Route discovery for an end-to-end path in a network is performed for a flow. A path is attempted to be discovered that satisfies QoS constraints for multiple metrics for the flow. The route discovery includes determining whether a path request for a path satisfying the QoS constraints is feasible, infeasible or undecideable based on information in a local QoS table. If the path request is determined to be undecideable, route discovery is performed with neighbors.

19 Claims, 8 Drawing Sheets

(56) References Cited

OTHER PUBLICATIONS

Mondal et al.—Supporting Application Network FLows with Multiple QoS Constraints—2009.*
Mondal et al.—Supporting Application Network FLows with Multiple QoS Constraints (Slides)—Uploaded 2007.*
Chu, Y. et al., "A Case for End System Multicast", downloaded Jun. 2, 2008.
Krishnamurthy, B. et al., "On the Use and Performance of Content Distribution Networks", ACM SIGCOMM Internet Measurement Workshop 2001.
Gummadi, K. et al., "Improving the Reliability of Internet Paths with One-hop Source Routing", downloaded Jun. 2, 2008.
Cho, K. et al., "The Impact and Implications of the Growth in Residential User-to-User Traffic", ACM SIGCOMM, Sep. 2006.
Li, Z. et al., "QRON: QoS-Aware Routing in Overlay Networks", Jun. 8, 2003.
Lao, L. et al, "Distributed QoS Routing for Backbone Overlay Networks", downloaded Jun. 2, 2008.
Andersen, D. et al., "Resilient Overlay Networks", ACM SOSP '01, Oct. 2001.
Subramanian, L. et al., "OverQos: An Overlay Based Architecture for Enhancing Internet QoS", downloaded Jun. 2, 2008.
Wang, Z. et al., "Quality of Service Routing for Supporting Multimedia Applications", downloaded Jun. 2, 2008.
Perkins, C. et al., "Ad-Hoc On-Demand Distance Vector Routing", downloaded Jun. 2, 2008.
"The Openbgpd Project", http://www.openbgpd.org/, downloaded Jun. 2, 2008.
Yalagandula, P. et al., "S3: A Scalable Sensing Service for Monitoring Large Networked Systems", ACM SIGCOMM'06, Sep. 2006.
Kohler, E. et al., "The Click Modular Router", ACM, downloaded Jun. 2, 2008.
Tang, W. et al., "MediSyn: A Synthetic Streaming Media Service Workload Generator", ACM NOSSDAV'03, Jun. 2003.
Open Shortest Path First (OSPF), http://www.cisco.com/en/US/docs/Internetworking/technology/handbook/OSPF.html, downloaded Jun. 2, 2008.
Duan, Z. et al., "Service Overlay Networks: SLAs, Qos and Bandwidth Provisioning", downloaded Jun. 5, 2008.

* cited by examiner

FLOW PATH DISCOVERY IN NETWORK TO GUARANTEE MULTIPLE METRIC QOS CONSTRAINTS

CROSS-REFERENCE TO RELATED APPLICATION

The present application claims priority from provisional application Ser. No. 61/059,059, filed Jun. 5, 2008, the contents of which are incorporated herein by reference in their entirety.

The U.S. Government has a paid-up license in this invention and the right in limited circumstances to require the patent owner to license others on reasonable terms as provided for by the terms of Contract N66001-05-9-8904 awarded by DARPA.

BACKGROUND

Many real-time multimedia and interactive applications, such as video streaming, IPTV, VoIP, videoconferencing, etc., require some kind of Quality-of-Service (QoS) guarantees over the Internet. For example, a video stream is transmitted from a source to one or many users via networks paths in the Internet. Excessive latency or low bandwidth of the paths may result in degradation of service. For example, the users may experience a stoppage, blackout, or other degradation of the video when viewing. Thus, QoS guarantees for network paths, such as guaranteeing a maximum latency for a network path, guaranteeing minimum bandwidth for a network path, or guaranteeing a maximum loss are beneficial when providing real-time multimedia and interactive applications.

Although there have been recent advances in QoS provisioning in the Internet through Intserv or Diffserv, it is far from being deployed, as these models requires changes in whole Internet infrastructure. Also, prior proposed solutions for provisioning QoS focus on either a single QoS metric or a derived composite metric to find a network path. Focusing on a single metric, however, fails to consider the applications that may require QoS guarantees for multiple metrics. A composite metric may consider multiple metrics by calculating a single value that represents the multiple metrics. However, a composite metric can fail to meet individual QoS constraints.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, flow route management in an overlay network is provided such that multiple QoS constraints can be guaranteed for applications. These applications include real-time multimedia and interactive applications, such as video streaming, IPTV, VoIP, videoconferencing, etc.

Flow route management administered over the overlay network includes a hybrid approach of using a path vector protocol to distribute aggregated path information combined with on-demand path discovery to discover paths matching diverse QoS requirements of applications, including the rich media services described above. Also, end-to-end session monitoring is used to trigger path adaptation based on pervasive sensing of network conditions to continually guarantee QoS for each flow. The flow route management system administering the flow management over the overlay network is highly scalable and is operable to efficiently find QoS paths satisfying multiple QoS constraints. Intermediate overlay nodes are easily configured for per-flow forwarding, and dynamically adapt to an alternate path if the current path fails to meet required QoS constraints.

Figure 1:
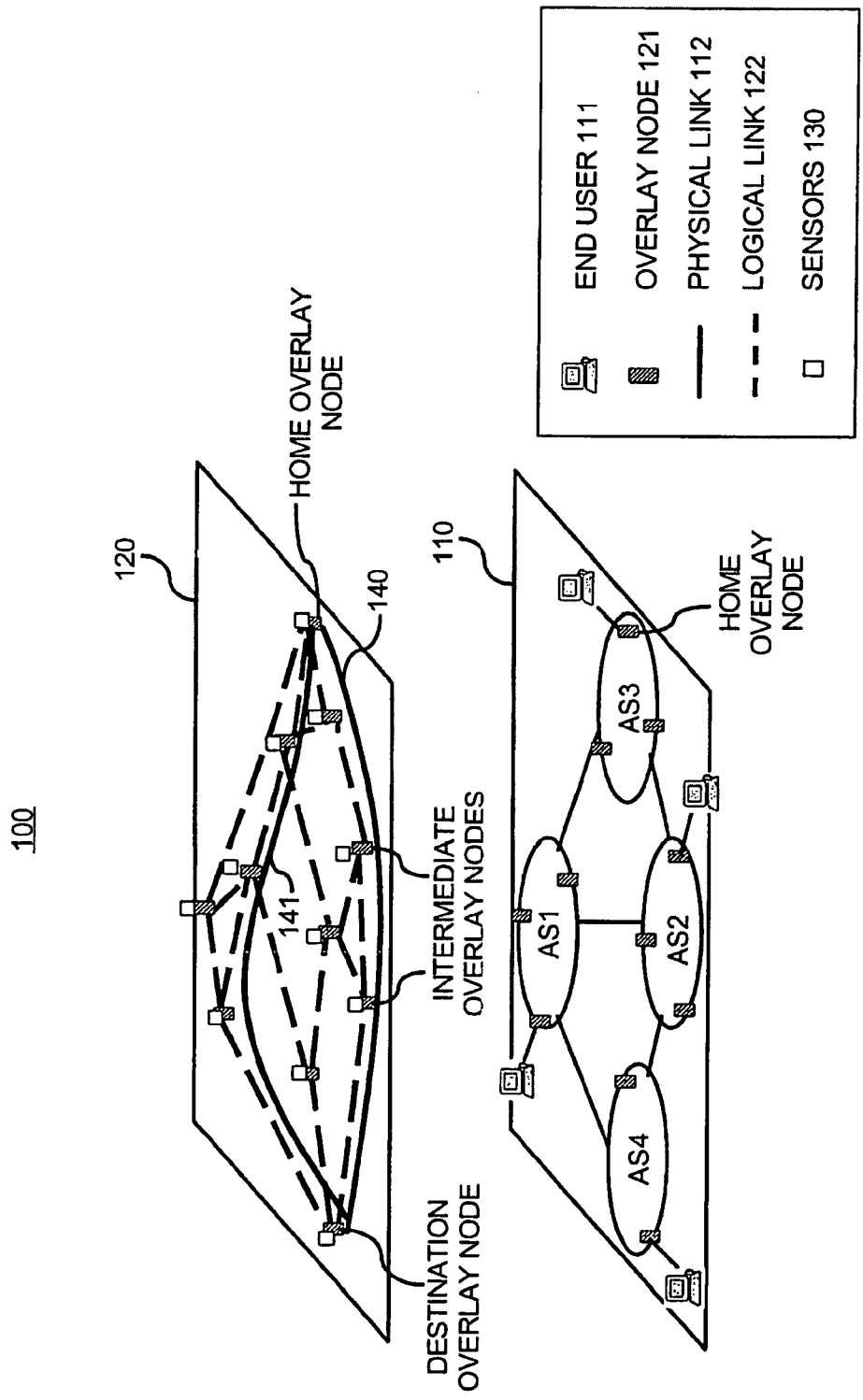
FIG. 1 illustrates an overlay network, according to an embodiment.

FIG. 1 illustrates a system 100, according to an embodiment. The system 100 includes an underlying physical network 110 comprised of network nodes in four autonomous systems (ASes) and physical links 112 among them. The physical links 112 are network links that are used to form end-to-end network paths. End users 111 are shown connected to the network 110.

The system 100 also includes an overlay network 120 comprised of overlay nodes 121. The overlay nodes 121 each include an overlay agent performing the functionality of the overlay network described herein, such as flow management with respect to QoS guarantees. The network 110 may include other types of nodes that are not shown. A node may include a computer system, router, bridge, etc.

The overlay nodes 121 are connected via logical links 122. The logical links are comprised of one or more of the physical links. Thus, the overlay network 120 includes the underlying network infrastructure of the network 110 with overlay nodes 121 and logical links 122. The overlay network 120 may be built on top of the Internet or other public or private computer networks.

The overlay nodes 121 include sensors 130 that are configured to measure network metrics for logical links. These measurements are used to determine whether QoS constraints can be satisfied for a given path or logical link.

For example, each of the overlay nodes 121 measures the link metrics to its direct overlay node neighbors periodically using the sensors 130. This information is disseminated efficiently and scalably among overlay nodes 121 as advertisements as described below. A neighbor node in the overlay network is a next hop overlay node in the overlay network. For example, an overlay neighbor is one logical link away from an overlay node.

A flow is application data following an end-to-end overlay path between a source and a destination overlay node. For example, a path is set up that satisfies QoS constraints for a video stream flow or a voice over IP (VoIP) flow. The flow may include packets in an IP network carrying application data between a source or home node and a destination node. Existing protocols may be used to establish a flow.

To set up an overlay path, an end user sends to its home overlay node a QoS flow setup request for a path to a destination. One example of a home overlay node is shown for an end user connected to AS3. The home overlay node finds a feasible path from the home overlay node to a destination overlay node. A feasible path is a path satisfying QoS metric constraints for the flow. Once a feasible path is found, all intermediate overlay nodes are configured for per-flow forwarding of the data packets. End-to-end path performance is monitored, and path adaptation is triggered if the current path fails to meet the QoS constraints for the flow.

A path change is shown in FIG. 1 in the overlay network 120. In response to a request from an end user, a path 140 was set up and used for a flow. However, over time, the bandwidth of the path 140 fell below a minimum bandwidth requirement for the flow. Then, a new path 141 was set up and used for the flow. Although, paths 140 and 141 do not share any logical links, in other instances, simply by changing one logical link, a new path is set up that satisfies QoS constraints for the flow.

Note that the network 110 and the overlay network 120 may include many more nodes than shown. Overlay nodes can be added incrementally to exploit all potential paths between a source and destination.

According to an embodiment, flow route management is used that is based on a path vector protocol. It aggregates alternative paths to various destinations. Also, each overlay node advertises only the best path to its overlay neighbor nodes for each reachable destination and for each QoS metric associated with a constraint. This greatly reduces the overhead of path dissemination.

However, path aggregation is still not a trivial problem when multiple metrics are associated with each path. For example, a best delay path might not be the best bandwidth path and vice versa. However, disseminating all alternative paths for each destination does not scale with network size. Moreover, it is possible that a QoS request cannot be served by either of best delay or best bandwidth path, but there exists a path which meet both delay and bandwidth requirements individually.

For example, assume path metrics for a best delay path from source to destination is (10 ms, 5 Mbps), where 10 ms is the delay and 5 Mbps is the bandwidth. A best bandwidth path has path metrics (100 ms, 10 Mbps). A request with QoS (20 ms, 8 Mbps) is not met by any of the best delay or best bandwidth paths. At the same time, it is not scalable to advertise all alternate QoS paths corresponding to each destination to neighbors. This immensely increases the protocol overhead.

According to an embodiment, a hybrid approach is used whereby each overlay node advertises only the best path for each metric to its neighbors and uses on-demand route discovery to find a QoS path when admit or reject decision cannot be taken based on local route information. By only advertising the best path for each metric, instead of advertising all alternative paths, the overhead is decreased and scalability is increased.

Figure 2:
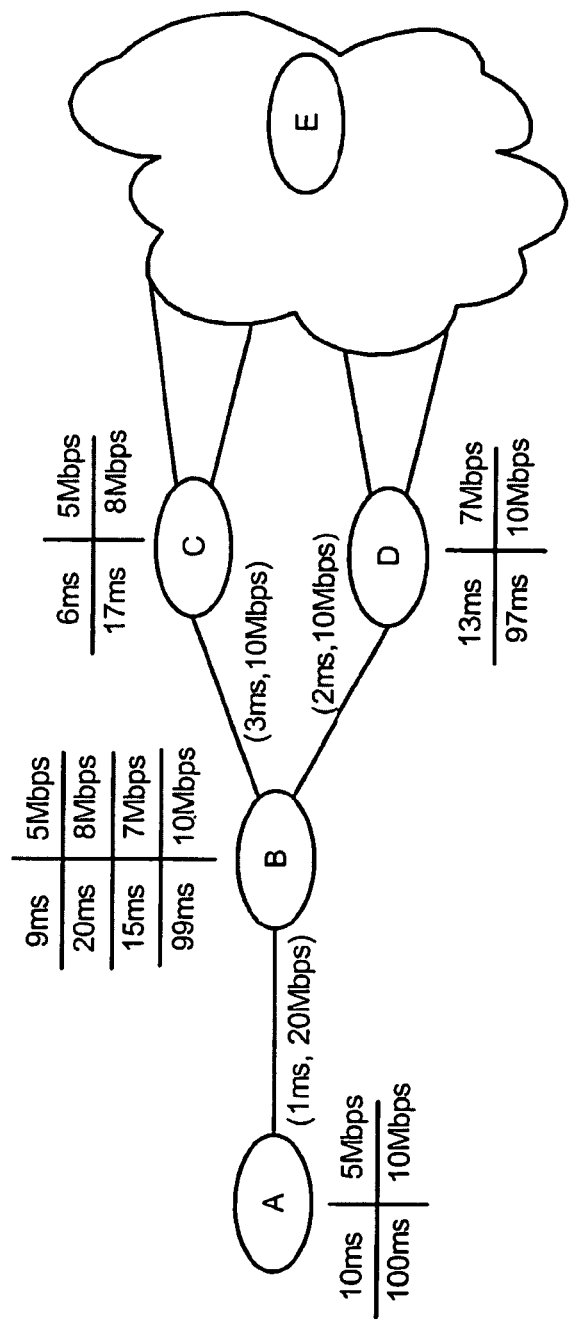
FIG. 2 illustrates an example of overlay nodes and QoS tables for the nodes, according to an embodiment.

This hybrid approach protocol is explained through the example shown in FIG. 2. FIG. 2 shows a simple overlay network and the QoS metrics considered are delay and bandwidth. QoS metrics are shown for each logical link. Also, portions of local QoS tables, which include information applicable to the destination node E, are shown for each overlay node.

The path vector protocol includes each overlay node advertising local reachability, collecting local link information, receiving reachability information from neighbors, aggregating received advertisements, and redistributing the aggregated path information. An advertisement is a message sent from one node to another that includes path metrics. The advertisement contain only path metrics for best paths. Best paths are the paths that have the best metrics pertaining to the different QoS constraints.

For example, overlay nodes A-E are shown. E may be connected to overlay nodes C and D directly or through other overlay nodes and overlay paths not shown. A, for example, is the source or home and E is the destination. A path needs to be determined from A to E.

Overlay nodes measure link metrics for delay and bandwidth to their neighbors. This is shown as the measured link metrics for the following logical links: logical link A,B (1 ms, 20 Mbps), logical link B,C (3 ms, 10 Mbps), and logical link B,D (2 ms, 10 Mbps). Sensors at the overlay nodes or a sensor network may be used to measure the link metrics.

Overlay nodes collect and advertise metrics only for the best path to its neighbors for each reachable destination. Also, advertisements are aggregated. For example, node C stores metrics for best paths in its QoS table to the reachable destination E from C. As shown at the node C, the best paths from C to E have path metrics for delay and bandwidth as follows: (6 ms, 5 Mbps) and (17 ms, 8 Mbps). Similarly, the best paths from D to E have metrics for delay bandwidth as follows: (13 ms, 7 Mbps) and (97 ms, 10 Mbps).

C advertises only the best delay path and the best bandwidth path to destination E to its neighbor B. Similarly, B learns about the best delay path and best bandwidth path through D. These are the advertisements sent only for the best paths for each metric sent to the neighbor.

The receiving node aggregates advertisements. Local link metrics are combined with received advertisements for aggregation. For example, B computes all alternative paths with their corresponding delay and bandwidth for destination E. This is shown as (9 ms, 5 Mbps) and (20 ms, 8 Mbps) in the QoS table at B. Note that delay is an additive metric. So the delay on each link must be added (e.g., 6 ms+3 ms=9 ms, etc.). Bandwidth is a concave metric, so the link with the smallest bandwidth is determined to be the bandwidth for the entire path (e.g., 5 Mbps=min(5 Mbps, 10 Mbps), etc.). Similarly for the advertisements are aggregated for the path through D. This is shown as (15 ms, 7 Mbps) and (99 ms, 10 Mbps) in the QoS table at B.

The QoS table at B shows that B knows about four alternative paths to E with QoS parameters (9 ms, 5 Mbps), (20 ms, 8 Mbps), (15 ms, 7 Mbps) and (99 ms, 10 Mbps) through its neighbors C and D. However, B only advertises the best delay path and best bandwidth path to A. Thus, A learns about two alternate paths to E through neighbor B with QoS (10 ms, 5 Mbps) and (100 ms, 10 Mbps).

As shown in FIG. 2 for the advertisements from B to A, an overlay node may not receive all the information for all the paths because only the best paths pertaining to each QoS metric are advertised. If a feasible path can be identified from the aggregated information in a local table of an overlay node, then that feasible path will be used to set up the flow. However, if a feasible path cannot be identified, then the overlay node may request information for paths from its neighbors that were not sent because they were not the best paths. This information may be used to find a feasible path.

Figure 3A:
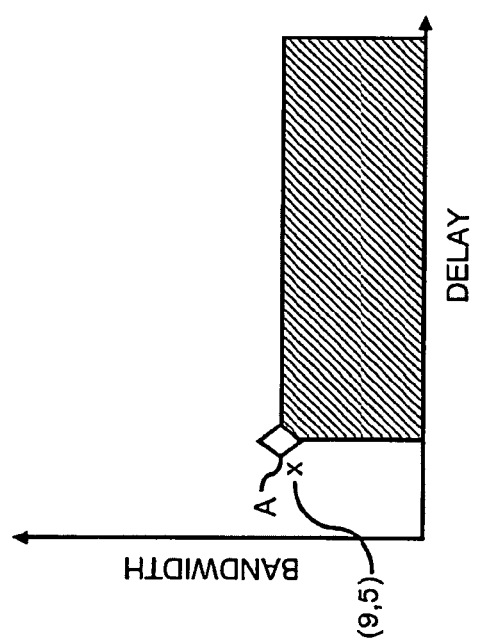
FIGS. 3A-B illustrate feasible, infeasible, and undecideable regions, according to an embodiment.
Figure 3B:
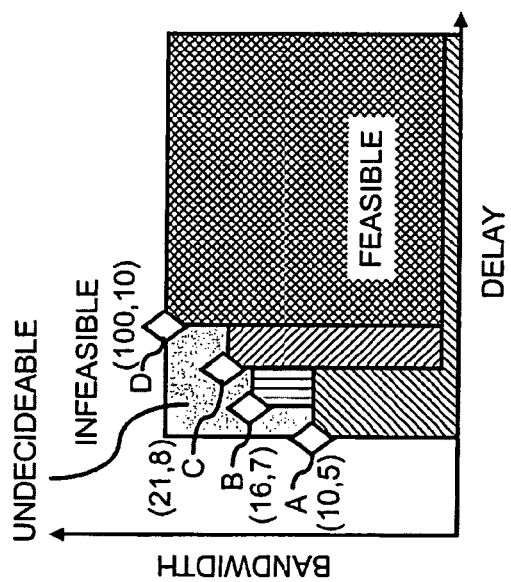

FIGS. 3A-B show QoS metrics for delay and bandwidth on a plane having delay for an x-axis and bandwidth for a y-axis. Assume an overlay node has in its QoS table for a particular destination points A (10, 5), B (16, 7), C (21, 8) and D (100, 10), each representing a best path to the destination based on received advertisements and local link metrics. Points A and B are for the best delay paths, and points C and D are for the best bandwidth paths.

A feasible request is a request that can be supported by a path. Feasible requests that can be supported by path represented by metrics (x, y) are paths in the area of the plane with delay >=x and bandwidth <=y. Delay >=x means that the requested delay (i.e., the delay constraint) must be greater than or equal to the actual delay of the path, and bandwidth <=y means that the requested bandwidth (i.e., the bandwidth constraint) must be less than or equal to the actual bandwidth of the path for the path to be feasible.

For example, FIG. 3A shows the path metrics for a received advertisement including the point A (10, 5), representing delay and bandwidth respectively. The shaded area represents the feasible requests with QoS metrics that can be satisfied by the path A. Constraints that fall outside this area represent requests that are infeasible or undecideable, where undecideable is described in further detail below. A request is received including constraints represented by point (9,5). This point is outside the area for the advertised path metrics, so it represents an infeasible path for those constraints in the request assuming only point A was in the QoS table for the destination. For example, comparing the constraint 5 Mbps to the path metric 5 Mbps indicates the 5 Mbps constraint is met because 5 Mbps constraint is equal to the 5 Mbps path metric. However, the 9 ms delay constraint cannot be met because 9 ms is less than the 10 ms path metric.

FIG. 3B shows the areas for all the points A-D. According to an embodiment, it has been determined that feasible requests that can be supported by the set of paths are the union of the areas supported by the individual paths. In FIG. 3B, feasible region is the union of all the hatched rectangles.

Assume points A (10, 5), B (16, 7), C (21, 8) and D (100, 10) each represent a best path to the destination based on received advertisements at the overlay node A and local metrics. Feasible requests that can be supported by path (x, y) is the area with delay x and bandwidth y. Feasible requests that can be supported by the set of paths are the union of the areas supported by the individual paths. It is now clear that if B advertises only the best delay (left most point) and best bandwidth path (upper most point) to A, there are some feasible requests which could be supported but A will not be able to admit them based on its own path table. This area is called the undecideable region (shaded area in FIG. 3B). However, A can admit requests based on its own path table, which are in the feasible region. The feasible region covers the area for point A and point D. Moreover, for requests falling in the infeasible region, A can reject the request based on its own path table.

Thus, based on a local QoS table, an overlay node can determine whether a request is feasible. If the overlay node determines that the request is not feasible, the overlay node determines whether the request is infeasible, i.e., falls in the infeasible region such as shown in FIG. 3A, or whether the request falls in the undecideable region. If the request falls in the undecideable region, on-demand route discovery is performed, according to an embodiment. If the request is determined to be in the infeasible region, the request is denied.

On-demand route discovery is used to determine whether to admit or reject a request when it falls in the undecideable region. For route discovery, an overlay node queries its neighbors about existence of a path for a QoS request in the undecideable region. Dissemination of a route discovery message is guided by the node's local table. The node queries only those neighbors who advertised reachability information about the destination in question.

For example, as shown in FIG. 2, node A would send the discovery request message, which is a request for information for additional routes, to the node B, because node B previously sent information for the destination in question. This process may then be repeated by B, and then by B's neighbors, and so on, until a path is found or a determination is made that a path does not exist that satisfies the constraints.

Dynamic path adaptation is an important component of the flow route management because there is no resource reservation, and new flows are admitted in the underlying IP network where overlay link metrics change uncontrollably. This means the selected path of some admitted flows may fail to meet the QoS constraints over time.

According to an embodiment, adapting new paths as path metrics change is performed in a distributed fashion. Each intermediate overlay node in the path knows the QoS constraints from the node to the destination. This information is propagated by flow set up messages, which are sent to all intermediate overlay nodes for flow-based routing. Also, an upstream node periodically pushes the QoS constraints from its downstream node. In a path from the node A to the node E shown in FIG. 2, node A is an upstream node of node B; node B is upstream from nodes C and D; and so on. Nodes C and D are downstream from node B, and node B is downstream from node A for the path from A to E.

For example, as delay of a link carrying packets to a next node changes, the upstream node forwards the delay constraint to its downstream node, and so on. Hence, each intermediate overlay node knows the most recent QoS constraints of the path from it to the destination. This simplifies the path restoration problem and allows distributed path adaptation. As a node determines that the downstream path is failing to meet the delay, bandwidth, or loss constraint, it triggers an alternate path search to the destination at the local node. If the node finds an alternate path to the destination in its QoS table that meets the constraints, then it switches to that path and informs all upstream and downstream nodes in the earlier path. Otherwise, it triggers an alternate path search at the immediate upstream node. This continues until it reaches the source node or already found an alternate path.

Figure 4:
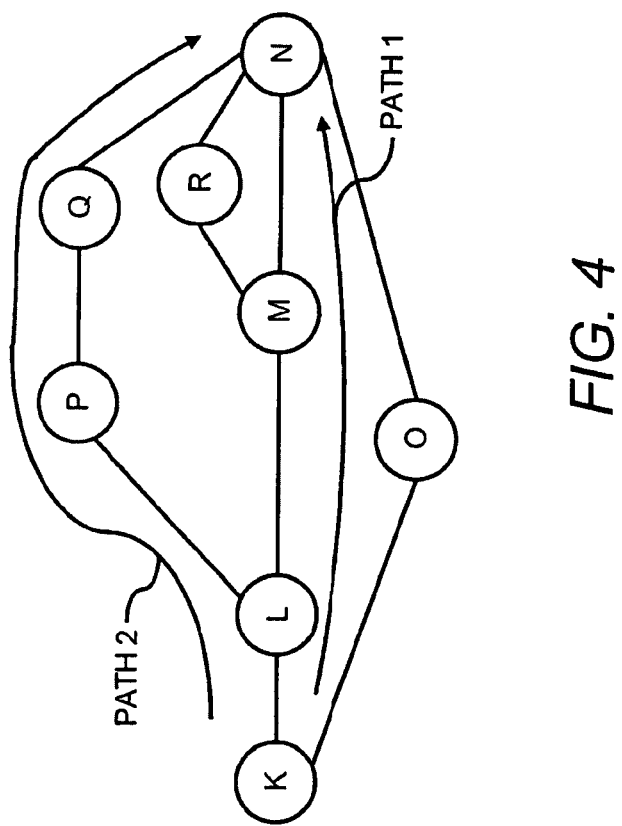
FIG. 4 illustrates an example of dynamic adaptation, according to an embodiment.

Path discovery and path restoration according to embodiments is explained by way of example with respect to the topology shown in FIG. 4. FIG. 4 shows overlay nodes K-R. The overlay nodes K-R learn about paths to other overlay nodes and their associated metrics using the path vector protocol.

When K receives a path request to N with bandwidth requirement B and delay bound D, K searches its own QoS table to find a path which meets the constraints. Assume K finds path 1 through L and M that meets both bandwidth and delay constraints. K then forwards a flow setup request with bandwidth requirement B and delay bound (D-delay(K-L)) to L. However, if K finds no path in K's QoS table which meets both the bandwidth and delay constraints, and, the request falls in the undecideable region, K sends a route discovery message to its neighbors.

Once the flow has been admitted with path K-L-M-N, suppose M notices that the overlay link M to N no longer meets the bandwidth and/or delay constraints. M then searches its local QoS table for an alternative path to N which meets the constraints. If none of the alternative paths, which in this case is only alternative path M-R-N, does not satisfy any of the constraints, M notifies its immediate upstream overlay node in the path 1, which is L, about this. This triggers path discovery at L, and, assume L already knows a path 2 through P satisfies all the constraints, it sends a flow setup request to P. This enables quick dynamic path adaptation in a distributed fashion. If L cannot find a path that meets the constraints, then the process is repeated with its immediate upstream node, and so on until a path is found or the path is rejected.

Figure 5:
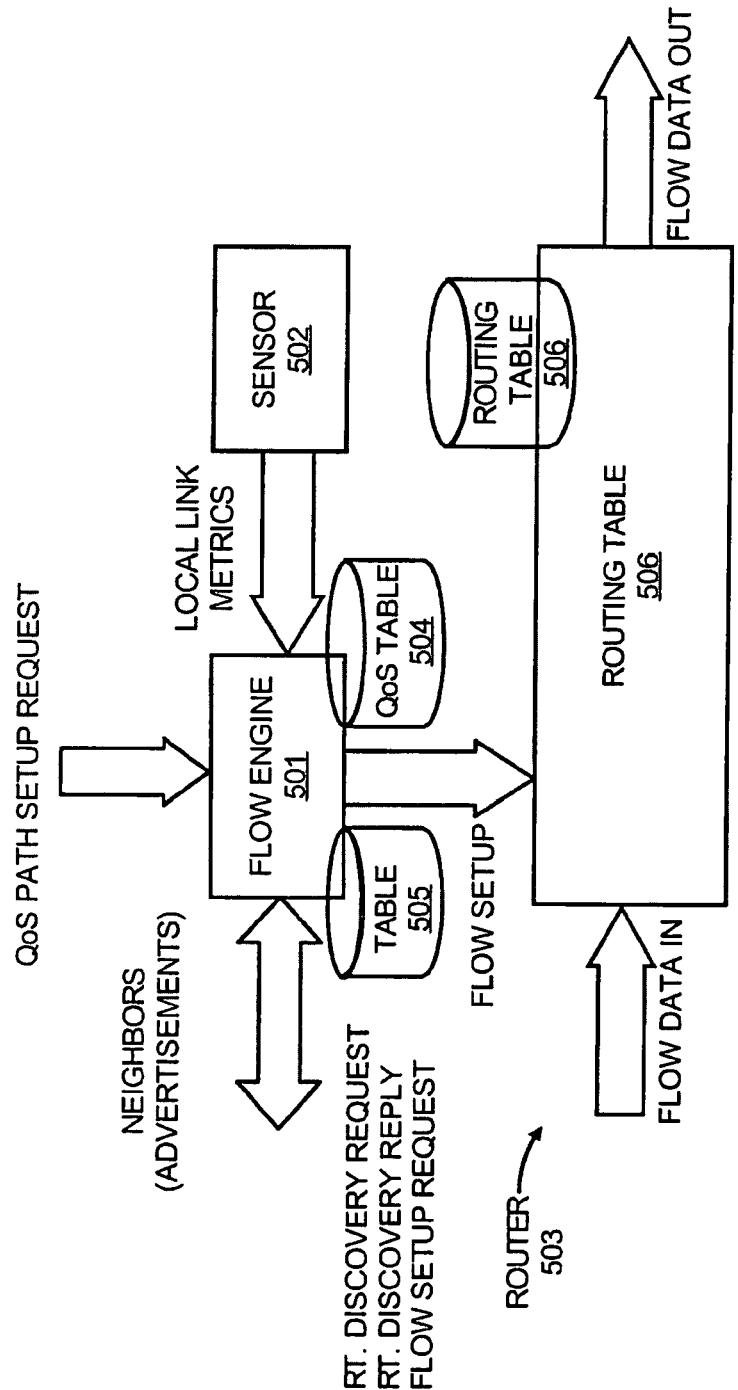
FIG. 5 illustrates a system architecture of an overlay node, according to an embodiment.

FIG. 5 illustrates a block diagram of an overlay node, according to an embodiment. The node includes a flow engine 501, a sensor 502, a router 503, and a QoS path table 504. The flow engine 501 performs the functionality described above, including path discovery based on its local QoS table, on-demand route discovery, dynamic path adaptation, and the path vector protocol. For example, advertisements are sent and received, route discovery requests are sent and replies are received. Flow set up requests are received, and flow setup is performed. The sensor 502 measures QoS metrics for links between the node and its neighbors. The QoS table 504 stores aggregated metrics, such as shown in FIG. 2. Another table, shown as flow table 505 stores indications of which neighbors sent advertisements and QoS constraints for flows.

The router 503 performs routing. For example, flow data is received and the router 503 consults a routing table 506 to determine the next hop in the overlay network for the flow data. The routing table 506 may include entries created from flow setup information received from the flow engine 501. An entry may include a flow ID and a next hop for the flow. In one example, the router 503 is a "click router".

Figure 6:
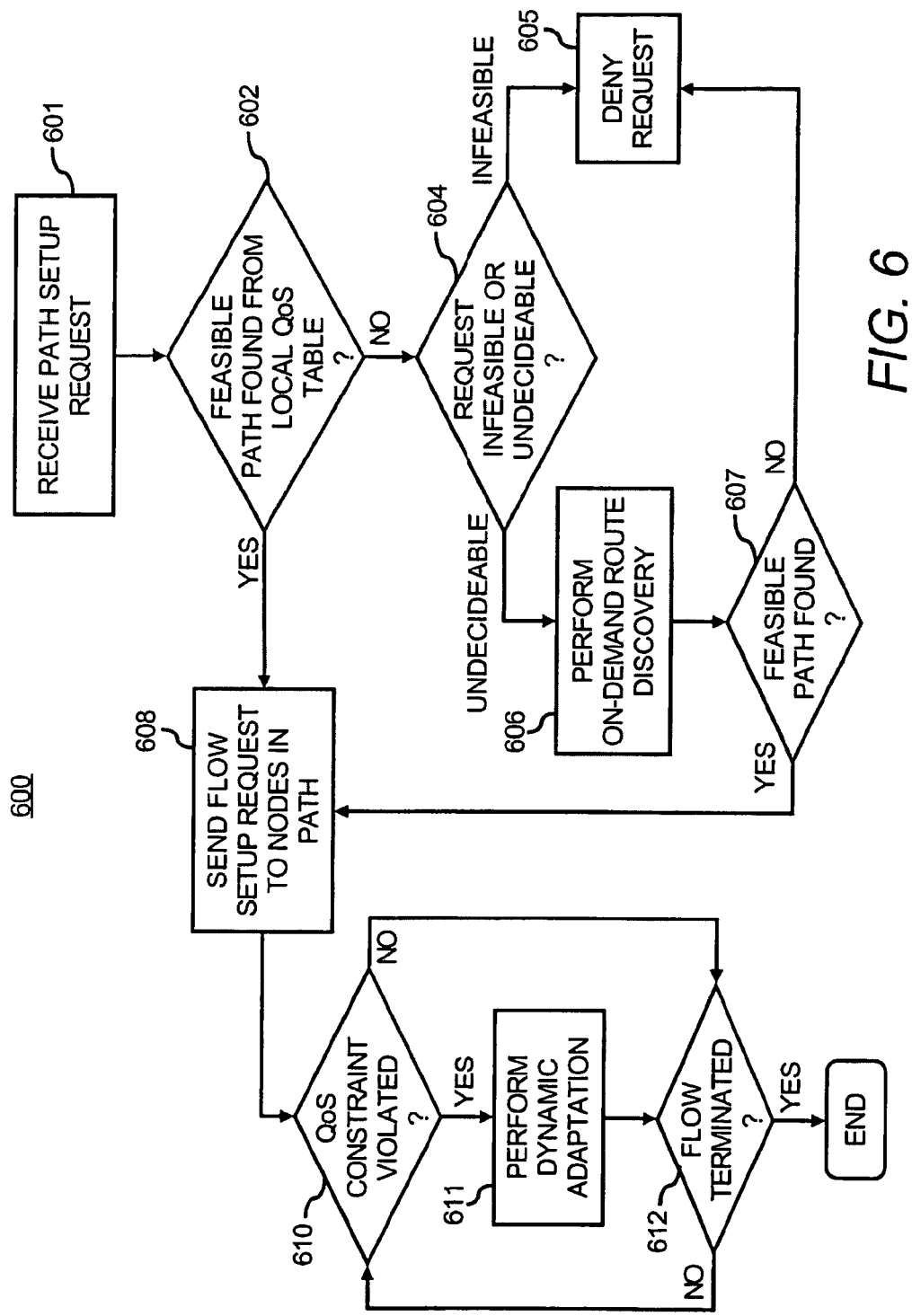
FIG. 6 illustrates a flowchart of a method for path discovery and adaptation, according to an embodiment.

FIG. 6 illustrates a flow chart for a method 600, according to an embodiment. At step 601, a path setup request is received at an overlay node indicating QoS constraints for a flow. The path set up request may identify the source and destination for the path.

At step 602, the overlay node searches its QoS path table to determine whether a path exists that satisfies the constraints. A path satisfying the constraints is a feasible path.

At step 603, if a path can be identified from the local table that is feasible, a flow setup request is sent to all the overlay nodes in the path, and the path for the flow is created at step 608.

At step 604, if the path is not found that is feasible, the node determines whether the path request is infeasible or if the path request is undecideable. For example, as described with respect to FIGS. 3A-B, the node determines whether the request constraints fall within the infeasible region. If the node determines the path is infeasible, a deny path message is sent to the node trying to create the path at step 605.

At step 604, if the node determines the path request is undecideable, e.g., falls within the undecideable region, on-demand route discovery is performed at step 606. This is where the node sends route discovery messages to its neighbors to identify other paths that may not have been advertised, and the neighbors may send discovery requests to their neighbors and so on until a feasible path is found or a feasible path cannot be found. At step 607, a determination is made if a feasible path can be found through the on-demand route discovery. If yes, a flow setup request is sent to all the overlay nodes in the path, and the path for the flow is created at step 608. If no, a reject request message is sent to the node trying to create the path at step 605. The request is rejected.

After the path for the flow is created, all the intermediate overlay nodes in the path, which are any overlay nodes between the home and destination, monitor QoS metrics for links to determine whether the QoS constraints for the flow are violated at step 610. If any QoS constraints are violated, then dynamic adaptation is performed to identify an alternative path at step 611, such as described with respect to FIG. 4. In some situations, there may be no new paths available that satisfy the constraints. Then, a message is sent indicating the current path is failing to meet the QoS constraints and no new path can be identified that satisfies the QoS constraints. Monitoring of link metrics and dynamic adaptation are performed until the flow is terminated at step 612.

Many of the systems and methods described herein are described with respect to overlay nodes in an overlay network. One or more of the systems and methods also apply to nodes that are not overlay nodes in an overlay network. These may include nodes, such as routers, computer systems, etc., operable to perform routing and other functions for non-overlay networks.

Figure 7:
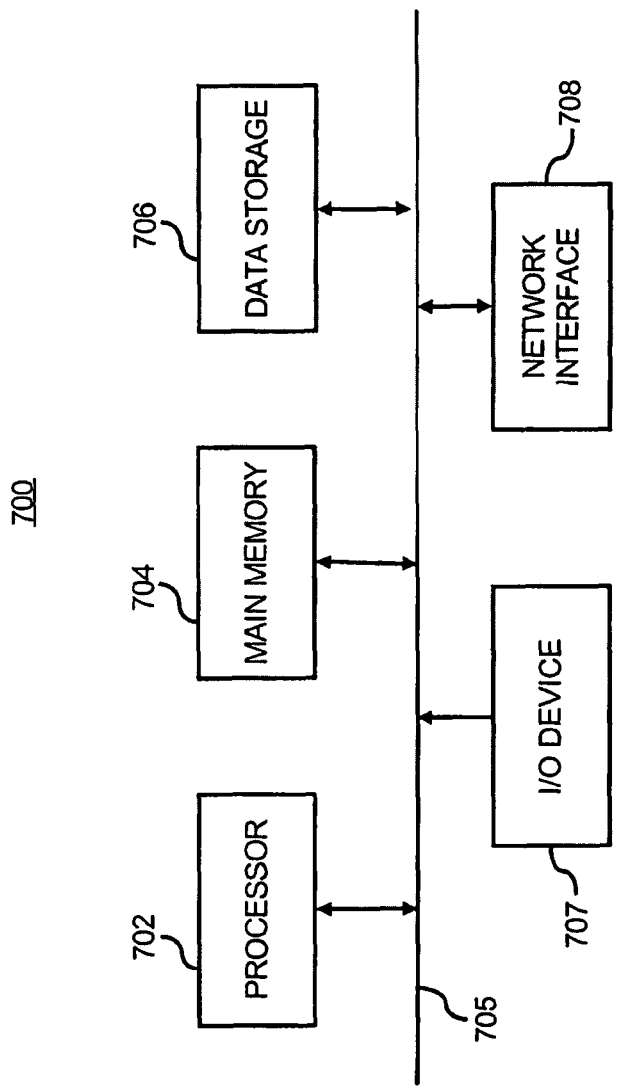
FIG. 7 illustrates a block diagram of a computer system, according to an embodiment.

FIG. 7 illustrates an exemplary block diagram of a computer system 700 that may be used as a node in a network or an overlay node in the overlay networks described above. The computer system 700 includes one or more processors, such as processor 702, providing an execution platform for executing software.

Commands and data from the processor 702 are communicated over a communication bus 705. The computer system 700 also includes a main memory 704, such as a Random Access Memory (RAM), where software may be resident during runtime, and data storage 706. The data storage 706 includes, for example, a hard disk drive and/or a removable storage drive, representing a floppy diskette drive, a magnetic tape drive, a compact disk drive, etc., or a nonvolatile memory where a copy of the software may be stored. The data storage 706 may also include ROM (read only memory), EPROM (erasable, programmable ROM), EEPROM (electrically erasable, programmable ROM). In addition to software for routing and other steps described herein, routing tables, network metrics, and other data may be stored in the main memory 704 and/or the data storage 706. Note that the flow engine and router shown in FIG. 5 include software that may be stored in the memory 704 and/or data storage 706 and executed by the processor 702.

A user interfaces with the computer system 700 with one or more I/O devices 707, such as a keyboard, a mouse, a stylus, display, and the like. A network interface 708 is provided for communicating with other nodes and computer systems.

One or more of the steps of the methods described herein and other steps described herein may be implemented as software embedded on a computer readable medium, such as the memory 704 and/or data storage 706, and executed on the computer system 700, for example, by the processor 702. For example, they may exist as software program(s) comprised of program instructions in source code, object code, executable code or other formats for performing some of the steps. Any of the above may be embodied on a computer readable medium, which includes storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the scope of the claimed embodiments.

What is claimed is:

1. A computer implemented method of route discovery for an end-to-end path in a network for a flow, wherein a path is attempted to be discovered that satisfies QoS constraints for multiple metrics for the flow, the method comprising:
   receiving, by a computer system coupled to the network, a path request for the flow, wherein the path request identifies the QoS constraints for the flow;
   determining, by a processor in the computer system, whether the path request is infeasible or undecideable, wherein the path request is undecideable if a determination is made that a feasible path does not exist based on information from a local QoS table and a determination is made that the path request is not infeasible, and if the QoS constraints for the path request fall in an undecideable region of metrics for the QoS constraints, the undecideable region being an area outside of areas for any feasible paths and an area for an infeasible region;

determining if the path request is infeasible and if determined to be infeasible denying the path request; and determining if the path request is undecideable and if determined to be undecideable sending route discovery messages only to neighbors that previously sent an advertisement for a destination for the flow to determine whether to admit or reject the path request, wherein to determine whether to admit or reject the path request includes aggregating advertisements for the destination with local link metrics to determine best paths to the destination until a path is found that satisfies the QoS constraints or a determination is made that a path does not exist that satisfies the QoS constraints.

2. The method of claim 1, wherein if a determination is made that a feasible path exists based on information in the local QoS table, sending a flow set up request to overlay nodes in the feasible path.

3. The method of claim 2, wherein a path is determined to be feasible if the path satisfies all the QoS constraints.

4. The method of claim 1, wherein determining if the path request is infeasible and if determined to be infeasible denying the path request further comprises, sending a message indicating the path request is denied.

5. The method of claim 4, wherein the path request is infeasible if one or more of the QoS constraints cannot be satisfied for any paths to the destination for the flow that are identified by an overlay node.

6. The method of claim 1, wherein sending route discovery messages only to neighbors that previously sent an advertisement for a destination for the flow further comprises:

sending route discovery messages from an overlay node only to first immediate downstream neighbors that previously sent advertisements for the destination, wherein the route discovery messages are requests for metrics for any paths not included in the previous advertisements; and repeating the step of sending route discovery messages for further downstream neighbors to the destination until a feasible path is found or until a feasible path cannot be found.

7. The method of claim 1, wherein aggregating advertisements for the destination with local link metrics to determine best paths to the destination further comprises:

receiving the advertisements from upstream neighbors, each advertisement including metrics for paths to the destination from a neighbor;

determining measurements of the local link metrics for links between the upstream neighbors and an overlay node;

aggregating the advertisements and the measurements;

determining the best paths for each QoS metric from the aggregation; and populating the local QoS table with the best paths for each QoS constraint, wherein the best paths are a subset of all known paths in an overlay network to the destination from the overlay node.

8. The method of claim 1, further comprising:

after a feasible path is created for the flow that satisfies the QoS constraints, monitoring links in an overlay path to determine whether any of the QoS constraints are violated.

9. The method of claim 8, further comprising:

if any of the QoS constraints are violated for a link, determining from the local QoS table whether an alternative path from an overlay node to the destination exists that satisfies the QoS constraints; and if the alternative path exists, sending a flow set up request to any new overlay nodes for the alternative path to provide a new path to the destination.

10. The method of claim 9, if a determination is made that the alternative path does not exist based on the local QoS table, sending a message to an immediate upstream overlay node in the current path requesting discovery of an alternative path from the immediate upstream overlay node to the destination that satisfies the QoS constraints.

11. The method of claim 10, further comprising:

repeating the step of sending a message requesting discovery of an alternative path satisfying the QoS constraints for further upstream nodes until an alternative path to the destination is found that satisfies the QoS constraints or until an alternative path cannot be found.

12. A node in a network configured to route flows, the node comprising:

a flow engine configured to identify feasible paths to destinations for flows;

a QoS table, wherein the flow engine is configured to determine whether an overlay path that satisfies QoS constraints for multiple metrics for a flow is feasible based on information in the QoS table for a destination, and the information only includes information for a best path for each QoS constraint to a destination of the path, wherein the flow engine is configured to determine if the overlay path is feasible by determining if the QoS constraints for the overlay path fall in a feasible region of metrics for the QoS constraints, the feasible region being an area that does not include areas for undecideable or infeasible regions, and wherein the flow engine is configured to aggregate advertisements for reachable destinations with local link metrics and populate the QoS table with metrics for best paths to the reachable destinations; and a router receiving flow set up information from the flow engine for a feasible path for the flow, the flow set up information including a flow ID and a next hop in the path from the node, wherein the router is configured to receive information from the flow and forward the information to the next hop.

13. The node of claim 12, wherein the node is an overlay node in an overlay network and the flow engine is configured to perform on-demand route discovery with its neighbors that previously sent advertisements for the destination, if the flow engine is unable to identify a feasible path from the information in the QoS table and the flow engine determines that a path request for the flow is undecideable.

14. The node of claim 12, wherein after the path is established, the flow engine is configured to attempt to identify an alternative path from the QoS table that satisfies the QoS constraints if a downstream link from the overlay node fails to satisfy any of the QoS constraints.

15. The node of claim 14, the flow engine is configured to request an immediate upstream neighbor to identify an alternative path if the flow engine is unable to identify an alternative path from the QoS table that satisfies the QoS constraints.

16. The node of claim 12, wherein the flow engine is configured to aggregate advertisements for reachable destinations with local link metrics, and populate the QoS table with only metrics for best paths to the reachable destinations.

17. The node of claim 16, wherein the flow engine is configured to send advertisements to neighbors only for the best paths to the reachable destinations.

18. A non-transitory computer readable storage medium storing software including instructions that perform a method of route discovery for an end-to-end path in a network for a flow, wherein a path is attempted to be discovered that satisfies QoS constraints for multiple metrics for the flow, the method comprising:

receive, by a computer system coupled to the network, a path request for the flow, wherein the path request identifies the QoS constraints for the flow;

determine, by a processor in the computer system, whether the path request is infeasible or undecideable, wherein the path request is undecideable if a determination is made that a feasible path does not exist based on information from a local QoS table and a determination is made that the path request is not infeasible, and if the QoS constraints for the path request fall in an undecideable region of metrics for the QoS constraints, the undecideable region being an area outside of areas for any feasible paths and an area for an infeasible region;

determine if the path request is infeasible and if the path request is determined to be infeasible the path request is denied; and determine if the path request is undecideable and if the path request is determined to be undecideable send route discovery messages only to neighbors that previously sent an advertisement for a destination for the flow to determine whether to admit or reject the path request, wherein determine whether to admit or reject the path request includes aggregated advertisements for the destination with local link metrics to determine best paths to the destination until a path is found that satisfies the QoS constraints or a determination is made that a path does not exist that satisfies the QoS constraints.

19. A computer implemented method of route discovery for an end-to-end path in a network for a flow, wherein a path is attempted to be discovered that satisfies QoS constraints for multiple metrics for the flow, the method comprising:

receiving a path request for the flow, wherein the path request identifies the QoS constraints for the flow;

determining whether the path request is infeasible or undecideable;

if the path request is determined to be infeasible the path request is denied; and if the path request is determined to be undecideable, sending route discovery messages only to neighbors that previously sent an advertisement for a destination for the flow to determine whether to admit or reject the path request, wherein the path request is undecideable if a determination is made that a feasible path does not exist based on information from a local QoS table and a determination is made that the path request is not infeasible, and further if the QoS constraints for the path request fall in an undecideable region on a graph of the metrics for the QoS constraints, the undecideable region being an area in the graph outside of areas for any feasible paths and an area for an infeasible region.

* * * * *